United States Patent [19]

Barcy

[11] Patent Number: 4,780,203
[45] Date of Patent: Oct. 25, 1988

[54] LIQUID SEPARATORS

[75] Inventor: Michael F. Barcy, Ashtead, England

[73] Assignee: CT Harwood Limited, Surrey, United Kingdom

[21] Appl. No.: 117,030

[22] Filed: Nov. 4, 1987

[30] Foreign Application Priority Data

Nov. 5, 1986 [GB] United Kingdom ............... 8626393

[51] Int. Cl.$^4$ .................... B01D 21/26; B01D 36/04
[52] U.S. Cl. .................. 210/304; 210/306;
210/311; 210/512.1; 210/532.1; 210/DIG. 5;
55/DIG. 25; 55/337
[58] Field of Search .............. 210/86, 304, 305, 306,
210/311, 456, 512.1, 519, 532.1, DIG. 5;
55/337, 459 R, 459 A, DIG. 25

[56] References Cited

U.S. PATENT DOCUMENTS

| | | | |
|---|---|---|---|
| 3,378,993 | 4/1968 | Veres et al. | 210/304 X |
| 3,424,311 | 1/1969 | Siedenburg | 210/86 |
| 4,305,825 | 12/1981 | Laval, Jr. | 210/512.1 |
| 4,312,751 | 1/1982 | Casamitjana | 210/94 |
| 4,502,954 | 3/1985 | Druffel | 210/136 |
| 4,608,161 | 8/1986 | Niemeier | 210/149 |

Primary Examiner—David L. Lacey
Assistant Examiner—Andrew J. Anderson
Attorney, Agent, or Firm—Hopgood, Calimafde, Kalil, Blaustein & Judlowe

[57] ABSTRACT

A separator for removing water from a lower density liquid fuel has a generally circular cross-section container with co-axual downwardly open outlet conduit that includes a portion widening towards the bottom entry opening. An inlet above the widening portion of the conduit directs a liquid flow obliquely downwards and radially offset from the conduit to generate a rotational flow promoting separation of the denser water fraction from the fuel. Smaller water droplets that drift down the outer surface of the outlet conduit because they are less influenced by centrifugal forces, are collected in an upturned lip at the bottom edge of the conduit. There they coalesce into larger drops that can fall through the outlet flow to the bottom of the container. A shield in the container lower region limits the entrainment of remaining smaller droplets from that lower region into the outlet flow.

9 Claims, 2 Drawing Sheets

LIQUID SEPARATORS

BACKGROUND OF THE INVENTION

This invention relates to liquid separators for separating heavier and lighter fractions in a mixture of liquids. It is particularly concerned, although not necessarily exclusively so, with the separation of water from a lighter liquid such as diesel fuel.

Water separators are employed in the inlet feed lines of diesel engines because of the ill effects that can be caused by even small amounts of water contamination of the fuel. Known apparatus often relies on the difference in densities between the two liquids to achieve separation of any water from the fuel flow, as for example in GB Nos. 1113621 and 1234022. In the example of GB No. 1234022, the entering flow is made to swirl around a frusto-conical outlet conduit, so tending to throw any heavier fraction, in particular water in the fuel, outwards away from the conduit. When the flow comes adjacent the inlet to the conduit, a sharp change of direction is imposed on the liquid, so that drops of water it contains are further restrained from entering the outlet conduit and eventually settle to be discarded.

There can still be a problem, however, if water is present in the form of extremely small droplets suspended in the fuel because these tend to separate out only very slowly. If the speed of flow of the liquid is too fast or if conditions are too turbulent such small droplets may simply fail to be separated at all. It is an object of the present invention to provide means that are able to reduce or avoid this problem.

SUMMARY OF THE INVENTION

According to the invention, there is provided a separator for removing a heavier fraction from a flow of a lighter fraction liquid, comprising a container having inlet porting in an upper region and on an axis that is offset from a central, upwardly extending outlet conduit, whereby to create a flow circulating around said conduit, the conduit comprising a downwardly widening region around which the flow circulates in its path into the conduit, and having at or adjacent its lower edge an upturned circumferential lip.

Smaller droplets of the heavier fraction that are less influenced by the centrifugal force as the flow swirls around the outside of the conduit or that even tend to cling to the conduit sides, will tend to be gathered in the peripheral lip as they drift downwards. There they are held until sufficient small droplets have agglomerated together and the resulting larger droplets that are shed from the lip have less tendency to be drawn into the main outlet flow through the conduit.

Preferably, the inlet porting opens substantially tangentially onto a downwardly inclined guide face for directing the incoming flow obliquely downwards, circulating around the outlet conduit, to generate centrifugal forces that tend to separate the higher density fraction from the main flow.

With such a configuration for the flow entering the container, a swirling flow can be established around the central outlet conduit with relatively little disturbance of the liquid stream as it enters the container and its swirling path. Accordingly, there is less tendency of water carried in the flow to be broken up into the smaller droplets that are more difficult to separate from the main flow.

According to a further preferred feature of the invention, disposed below the entry region of the outlet conduit there is a deflector shield having downwardly directed side regions extending from an uppermost central region to form a trap for smaller droplets of the heavier fraction that are entrained with a flow from a lower region of the container towards the outlet conduit.

The significance of this measure in a diesel fuel water separator lies in the observation that very small water droplets, even when they descend to the collecting region at the bottom of the separator, do not agglomerate easily with the main body of water that has collected there, probably due to surface tension effects. There is a tendency for such small droplets to be caught in an upwards flow to the central region of the exit conduit, even though that flow may be relatively slow. The trap can be arranged to retain such small water droplets that enter it so that the droplets will collect there until, as they progressively agglomerate with each other, drops are formed of such a size that they fall through the slow upward flow to join the water collected at the bottom of the container.

It is particularly desirable to deploy the above-described measures in combination. This can result in an overall improved performance as compared the sum of the improvements that can be expected from the individual measures, probably because when conditions are such that a relatively large number of smaller droplets are present, the relative efficiency of each measure if employed alone may be somewhat reduced.

An embodiment of the invention will be described in more detail, by way of example, with reference to the accompanying drawings, in which:

DESCRIPTION OF THE PREFERRED EMBODIMENT

Figure 1:
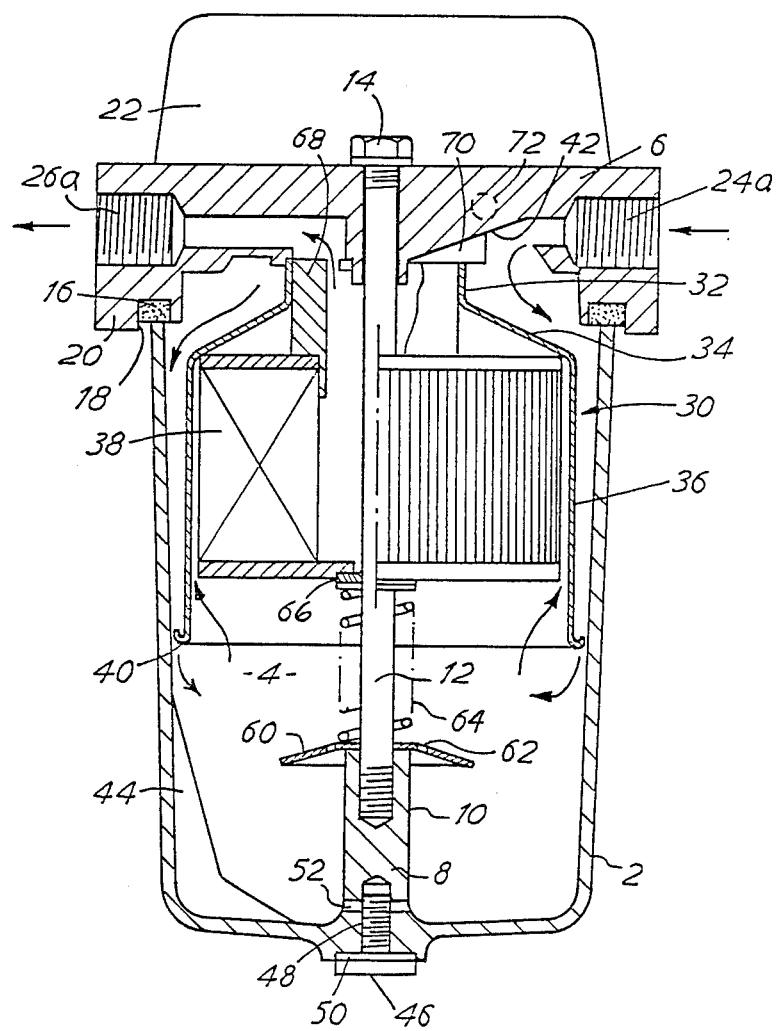
FIG. 1 is a vertical section view of a fuel/water separator according to the invention.
Figure 2:
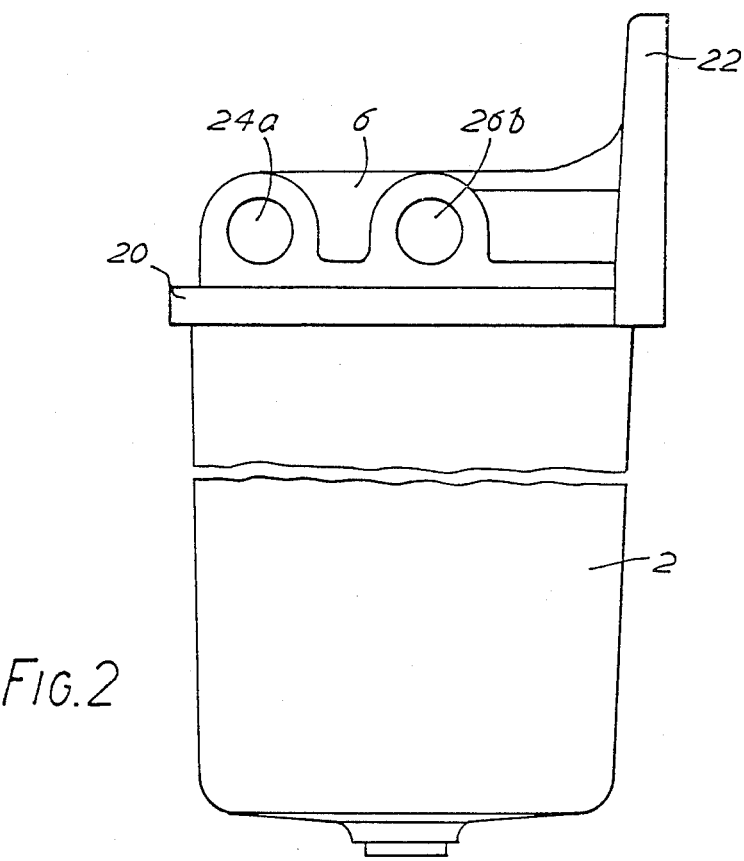
FIG. 2 is a side view of the separator in a direction transverse to that of FIG. 1.
Figure 3:
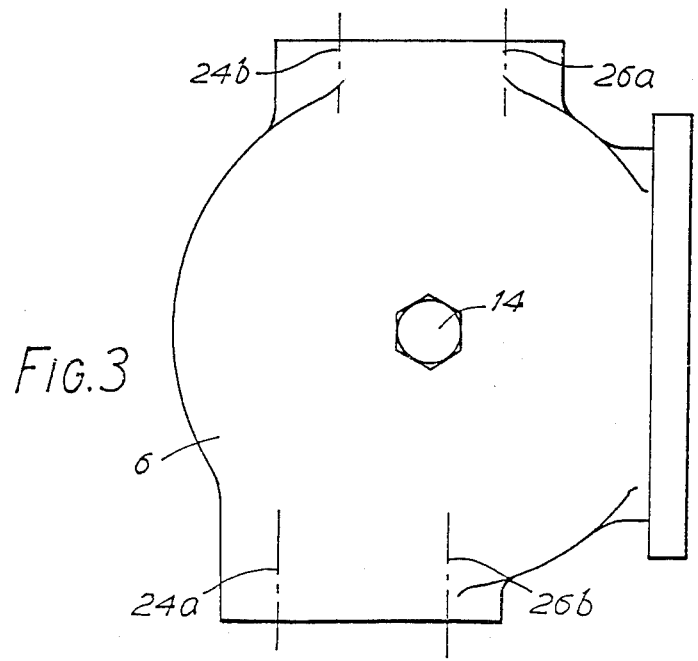
FIG. 3 is a top plan view of the separator.

The illustrated separator, intended for the separation of water that may be present in a flow of diesel fuel, comprises a pot-like container body 2 providing a flow chamber 4 generally of circular cross-section and closed by a top plate 6. A central vertical stem 8 rising from the bottom of the body interior has a tapped bore 10 in its upper end engaged by a screw bolt 12 the head 14 of which rests on the top plate 6 so that the plate is clamped firmly on the body 2 with a sealing ring 16 in a peripheral recess 18 in its bottom flange 20 pressed against the top rim of the body. The top plate has an integral rear mounting flange 22 which may have apertures (not shown) to bolt the separator to a bulkhead.

The top plate has alternative inlet ports 24a, 24b on opposite sides, and similarly alternative outlet ports 26a, 26b, so that flow through the separator can be from left to right or vice versa, the unused ports being blanked off. Both outlet ports communicate with the interior of a tubular outlet conduit 30 that depends downwards into the chamber from the top plate. The individual ports of each pair of alternative ports 24a, 24b and 26a, 26b are shown with axes at different offsets from the central vertical axis of the container. This is primarily to allow the separator to be fitted into existing installations and also to facilitate casting of the top plate. In principle the two inlet ports can be equally offset and the two outlet ports can be equally offset or radial to the container axis.

The conduit 30 is in the form of a body of revolution, comprising a cylindrical upper portion 32 that extends to below the inlet port 24, a widening, generally frusto-conical, medial portion 34 providing a transition between the upper portion 32 and a larger diameter cylindrical lower portion 36. Within the lower portion there is a replaceable filter element 38 of generally conventional form, the fuel oil being drawn radially inwardly through the element from a narrow annular space between the element and the conduit portion 34. The cylindrical lower portion extends a short distance below the element 38, and at its bottom limit there is a small upturned lip 40 extending continuously around the edge of the conduit. Only a narrow annular gap is left between the wall of the body 2 and the lip 40, preferably between 3.0 mm and 1.5 mm wide.

The inlet ports 24 are offset from the vertical centre line of the outlet conduit 30 so that their axes pass to one side of the conduit upper portion 32. In this way, the incoming flow adopts a circulatory or swirl motion around the outlet conduit as it descends to enter the conduit through its open bottom face. In this circulating flow, at first descending and then being diverted upwards into the outlet conduit, water droplets in the lighter fuel oil tend to be separated by centrifugal action, generally as described in GB No. 1234022.

As the flow enters the chamber, however, the change of conditions can lead to any water it contains being broken up into smaller droplets of a size which may be difficult or impossible to separate from the fuel oil by centrifugal action. In order to limit this problem, the underside of the top plate 6 adjacent each inlet port has a surface 42 that slopes downwardly away from the associated port. The surface is at an angle generally not much more than 20° to the horizontal and preferably less than that figure. From the operative inlet port, the incoming flow is guided by the adjacent surface 42 with minimum disturbance into its circulating and descending path.

Smaller droplets may still be in the flow at this stage, possibly because of flow patterns further back in the fuel supply system. If these are unable to be influenced sufficiently strongly by the centrifugal effects in the swirling flow, they will tend to drift down the outer face of the outlet conduit. The fall of the droplets is arrested by the lip 40 which forms a collecting gutter around the bottom of the outlet conduit. These smaller droplets are thus prevented from being swept into the outlet flow through the conduit.

As sufficient individual droplets gather in the gutter they tend to coalesce and form larger drops of water that overflow the lip when their size is sufficient. Preferably the cross-sectioned width of the gutter is not substantially more than 2 mm so as to limit the increase of droplet size. Very large drops an break up again as they fall but large drops of lesser size can fall through the fuel oil with less tendency than the smaller droplets to join the main flow into the outlet conduit. These large drops are thus better able to descend into the final water-collecting zone at the bottom of the chamber. The location of the filter element some distance above the bottom edge of the conduit 30 helps to ensure the drops do not enter the element where they may degrade the filter material.

The swirling motion around the outlet conduit 30 is dissipated in the bottom collecting region of the chamber by a series of three equispaced radial vanes 44 projecting into the inner face of the body 2. The water that has settled in the bottom of the chamber may be removed from time to time by slackening a screw 46 held in a tapped bore 48 in the bottom of the container so as to loosen a sealing member 50 it bears against, thereby to allow the water to exit through crossbores 52 leading into the tapped bore 48, and from there out of the chamber past the freed sealing member 50.

There may also be small water droplets that have reached the lower region of the container because of their higher density but that fail to coalesce with the main body of water that collects there, and instead simply drift with the eddies that occur in the fuel oil filling the chamber above this. There is a risk that such droplets drifting around below the outlet conduit 30 can be picked up by the main outlet flow of fuel oil and entrained with it.

If the filter element 38 is one that is fitted with a bottom plate, some protection may be afforded by that plate, but even in that case the effect may prove troublesome. To limit the problem, the stem 8 carries at its top a downwardly tapering frusto-conical shield 60 that acts as a barrier below the mouth of the outlet conduit. Small droplets carried upwards by eddies in the lower central region of the chamber thus find themselves prevented by the shield 60 from rising into the outlet conduit. If an accumulation of such droplets coalesces into a larger drop within the shield, as the drop forms it will tend to sink more readily and be merged into any body of water already at the bottom of the chamber. As with the outlet conduit lip, it is therefore only necessary to provide space within the shield itself for a relatively small volume of retained liquid.

At the top of the shield there are a number of holes 62. These are made too small to allow any water droplets to pass through but air rising into the shield can escape through them and into the outlet conduit. This ensures that small quantities of air that might be admitted when water is drained through the tapped bore 48 will not accumulate within the shield, which would render it ineffective for collecting the water droplets.

Conveniently the shield 60 is clamped in place by a spring 64 surrounding the bolt 12 to bear at one end on the shield and at the other end, through a washer 66 on the filter element 38 to hold that element in sealing contact against an apertured collar 68 bearing an internal boss 70 of the top plate 6.

For low temperature operation of diesel engines, heating of the inlet fuel flow may be required. Advantageously, the separator incorporates a heating element for this purpose and to ensure that waxing of the fuel does not interfere with the separation process. Such an element may be provided by an electrical resistance heater arranged as a spiral, indicated schematically at 72, in the top of the chamber around the outlet conduit, preferably close to the surfaces 40 so as to act on the flow as it enters the chamber.

In some installations it may not be required to incorporate a filter element into the separator. The outlet conduit may then be constructed without a cylindrical lower portion, but the lip 40 will still be formed on the lower edge of the conduit.

I claim:
1. A separator for removing a heavier fraction from a main flow of a liquid lighter fraction, comprising a container, inlet porting in an upper region of said container, an outlet conduit extending upwardly and disposed centrally within said container, a lower edge of said conduit providing an entry opening to the conduit, said inlet porting having a flow axis that is offset from said centrally disposed outlet conduit whereby to create a flow circulating around said conduit, the conduit comprising a downwardly widening region around which the flow circulates in its path towards said conduit entry opening, an upturned circumferential lip being formed on the conduit at or adjacent said lower edge whereby to provide a collecting gutter for smaller droplets of said heavier fraction for promoting agglomeration of said smaller droplets.

2. A separator according to claim 1 wherein a downwardly inclined guide face is provided within the container adjacent said inlet porting for directing the incoming flow obliquely downwards in its circulating path around the outlet conduit to generate centrifugal forces that tend to separate the higher density fraction from the main flow, said inlet porting opening substantially tangentially onto said guide face.

3. A separator according to claim 2 wherein the downward inclination of the guide face is not substantially more than 20 degrees.

4. A separator according to claim 2 wherein heating means are disposed adjacent said guide face for heating the incoming flow.

5. A separator according to claim 1 wherein the downwardly widening region of the outlet conduit is spaced below said inlet porting.

6. A separator according to claim 1 wherein a deflector shield is disposed within the container, spaced below the outlet conduit, said shield having downwardly directed side regions to form a trap for smaller droplets of the heavier fraction entrained in an upwards flow towards the outlet conduit.

7. A separator according to claim 6 having at least one aperture of a restricted size in said shield such as to prevent the passage of the heavier fraction therethrough but to permit the upward escape of gas collected under the shield.

8. A separator according to claim 1 wherein a filter element is disposed within the outlet conduit.

9. A separator according to claim 1 wherein the container comprises a generally circular cross-section upper region extending to below the outlet conduit, and a lower region below said upper region, at least one inwardly projecting element being disposed in said lower region to dissipate rotational motion of the liquid in the lower part of the container.

* * * * *